United States Patent Office 3,582,373
Patented June 1, 1971

3,582,373
REFRACTORY MAGNESIA
William Cecil Gilpin, Woodhouse, near Worksop, and Dennis Woodhouse, Trevor Wilkinson Lythe, and Gerald Charles Padgett, Worksop, England, assignors to The British Periclase Company Limited, Hartlepool, England
No Drawing. Continuation-in-part of application Ser. No. 517,464, Dec. 29, 1965. This application Nov. 7, 1967, Ser. No. 681,109
Claims priority, application Great Britain, Dec. 30, 1964, 52,879/64
Int. Cl. C04b 35/04
U.S. Cl. 106—58     6 Claims

ABSTRACT OF THE DISCLOSURE

A dead-burnt refractory magnesia suitable for use in the manufacture of high hot strength magnesia refractories comprises by weight 90 to 95% magnesium oxide, up to 5% calcium oxide, the ratio of lime to silica contents being between 1.5:1 and 2.2:1, iron oxide and alumina in total amount not exceeding one quarter the total weight of lime and silica, boron oxide up to 0.1% and an alkali metal oxide content not less than the content of boron oxide and not exceeding 0.25%.

---

This patent application is a continuation-in-part of application Ser. No. 517,464 filed on Dec. 29, 1965, now abandoned.

This invention relates to refractory magnesia and in particular to a dead-burnt high purity refractory magnesia suitable for use in the preparation of magnesia refractories, for example, bricks blocks, mortars, ramming mixes, gun mixes and castable products made from dead-burnt magnesia or from dead-burnt magnesia in combination with chrome ore or other refractory minerals and oxides.

Magnesia refractories and dead-burnt magnesia are often referred to in the art as, respectively, magnesite refractories and dead-burnt magnesite. However these terms have arisen because natural magnesite (magnesium carbonate) was originally the mineral mainly employed as the source material. Today the source material is often magnesite, but is also frequently magnesium hydroxide precipitated from sea-water bitterns or the like. The mineral brucite is also used. Whatever the source material it is first dead-burnt, when it is converted to magnesia or as it is often called "periclase." Dead-burning is not always carried out in one step. Frequently, and in order to obtain a dense refractory grain and one in which the individual pieces are of substantial size, say, from ¼" to 1" mean diameter, the source material is first calcined to a chemically active or caustic oxide which is then briquetted in high pressure rolls and the briquettes are then burnt to a high temperature at, for example, from 1650° C. to 1900° C. in shaft or rotary kilns. Such dead-burnt magnesite is used for the production of refractories to serve as linings in metallurgical furnaces, especially steel melting furnaces, for example, open hearth furnaces, electric arc furnaces, and more particularly today those furnaces known as oxygen converters and which are used for the LD, LD/AC and Kaldo steelmaking processes. Commonly used refractories consist of magnesia either alone or, for example, in combination with chrome ore or dead-burnt dolomite. The refractories are of both the ceramically bonded (i.e. fired) and chemically bonded types. This invention relates principally to ceramically bonded magnesia refractories.

In producing dead-burnt magnesia from whatever source strenuous efforts are made to obtain material of high purity but even so, the highest purity commercial products contain as principal impurities lime and silica. They may also contain iron oxide and aluminium oxide. These substances are usually present in the range of from 0.1% to 5%. Many other substances may also be present and in the range of from 0.01% to 0.5% are often found titanium oxide, manganese oxide, chromium oxide and boron oxide. Traces of many elements may be found in amounts of up to 0.01%. Analyses of trace elements to be found in two commercial magnesias are shown in Table 1. Many, but not all of the substances present in magnesia detract from its refractory properties, and particularly when it is made into bricks they detract from the high temperature strength of the bricks. At the present time it is an aim of manufacturers of refractory products, and especially refractory bricks, to make them such that they will have high strength at all temperatures, but particularly at high temperatures, and especially at temperatures above 1200° C. It is an object of this invention to provide

TABLE 1.—TRACE ELEMENTS IN SYNTHETIC MAGNESIAS

| Quality | Atomic, p.p.m. | |
|---|---|---|
| | 11 | 112 |
| U | 0.06 | 0.06 |
| W | 0.2 | 0.2 |
| Nd | 0.08 | 0.24 |
| Pr | 0.02 | 0.06 |
| Co | 0.06 | 0.6 |
| La | 0.06 | 0.6 |
| Ba | 0.3 | 8 |
| Sn | 0.08 | 0.2 |
| Mo | 0.08 | 0.08 |
| Nb | 0.02 | 0.02 |
| Zr | 0.4 | 0.4 |
| Y | 0.2 | 0.6 |
| Sr | 0.6 | 0.6 |
| Rb | 0.2 | 0.6 |
| Br | 0.04 | 0.1 |
| Ga | 0.06 | 0.15 |
| Zn | 1.2 | 5.0 |
| Cu | 0.3 | 0.3 |
| Ni | 2 | 2 |
| Mn | 6 | 200 |
| V | 20 | 6 |
| Ti | 8 | 25 |
| K | 2 | 2 |
| Cl | 3 | 3 |
| S | 4 | 4 |
| P | 6 | 20 |
| Na | 20 | 60 |
| F | 0.2 | 10 |
| B | 350 | 500 | refractories having improved properties and in particular improved hot strength and we have now discovered that refractory products made from magnesia containing lime, silica, iron oxide, aluminium oxide and boron oxide may be improved by control of the proportions of these oxides and at the same time ensuring that the material which is dead-burnt to produce the refractory magnesia contains a sufficient quantity of an oxide such as sodium oxide, potassium oxide or lithium oxide, or a substance which will yield such an oxide under the conditions of the dead-burning process.

The present invention provides a dead-burnt high purity refractory magnesia which is capable of formulation into refractory bricks having a modulus of rupture of at least 1500 lbs./sq. inch at 1260° C., at least 1000 lbs./sq. inch at 1400° C. and at least 800 lbs./sq. inch at 1500° C.

According to the present invention there is provided a dead-burnt refractory magnesia comprising between 90% and 99% by weight of magnesium oxide (MgO) and up to 5% by weight of calcium oxide (CaO), the ratio of the weight of calcium oxide to the weight of silica ($SiO_2$) in the dead-burnt magnesia being between 1.5:1 and 2.2:1, the dead-burnt magnesia further comprising iron oxide ($Fe_2O_3$) and alumina ($Al_2O_3$) in total amount by percentage weight up to one quarter of the combined weight of calcium oxide and silica, boron oxide ($B_2O_3$) up to 0.1% by weight, and at least one oxide selected from sodium oxide ($Na_2O$), potassium oxide ($K_2O$) and lithium oxide ($Li_2O$) in total amount at least equivalent to the weight of boron oxide and up to a maximum of 0.25% by weight.

Preferably the ratio of the weight of calcium oxide to the weight of silica in the magnesia is between 1.7:1 and 2.0:1. It is also preferred that the boron oxide content of the dead-burnt magnesia should be less than 0.05% by weight.

Additionally, but not essentially, the magnesia may contain chromium oxide in an amount up to 0.5% to aid densification.

The magnesia materials which are used in the preparation of the dead-burnt refractory magnesias of this invention are synthetic magnesias produced from sea-water, magnesium bearing brines and the like. They contain from 90% to 99% by weight of magnesium oxide, preferably at least 95% or 96%, and also contain lime, silica, iron oxide, aluminium oxide and boron oxide. Additionally they may contain up to about 0.5% chromium oxide and other trace elements. The ratio of lime and silica contents in these magnesia materials will normally be in the range 1.0:1 to 4.0:1, preferably from about 1.5 to about 2.7:1, or more preferably to about 2.2:1.

In order to produce the dead-burnt refractory magnesias of this invention, which contain comparatively large amounts of one or more alkali metal oxides, it is necessary to ensure that the magnesia to be dead-burned contains a sufficient quantity of sodium oxide or a chemical equivalent thereof, such as potassium oxide or lithium oxide. The term chemical equivalent also includes such substances as will yield sodium oxide or an equivalent oxide under the conditions of the dead-burning process. The amount of oxide, or oxide precursor, which is employed is usually in excess of 0.20% or 0.25% by weight, and is generally above 0.50% and up to 1.0% by weight, although not as high, of course, as to impair the refractory properties of refractories made from the dead-burnt magnesia. The amount of added oxide, or oxide precursor, which is included in the magnesia starting material must be such as to yield in the magnesia after dead-burning an amount at least equal to the residual amount of boron oxide and reduce the level of boron oxide to a maximum of 0.1% if the amount in the original magnesia exceeds this figure. The exact amount is found by experiment but a percentage amount equal to twice the percentage weight of boron oxide is usually suitable. Suitable precursors of sodium oxide are, e.g. sodium carbonate, sodium hydroxide and sodium sulphate. Sodium chromate may also be used, but the halides of sodium such as the chloride and fluoride may not be used, neither may sodium salts which would introduce deleterious substances, e.g. sodium borate.

If necessary lime-bearing and/or silica-bearing materials may be added to the magnesia material to be subjected to dead-burning in order to bring the lime and/or silica contents and the lime-silica ratio to values as defined in the dead-burnt magnesias of this invention.

The term "lime-bearing material" is used to mean any material containing or consisting of lime whether chemically combined or not and which will yield lime for combination with other substances under conditions experienced during the process of dead-burning.

The term "silica-bearing material" is used to mean any material containing or consisting of silica whether chemically combined or not and which will yield silica for combination with other substances under conditions experienced during the process of dead-burning.

It is to be understood that the lime-bearing or silica-bearing materials which may be used do not contain appreciable amounts of other constituents which are deleterious to the refractory properties of the product. When lime-bearing and/or silica-bearing materials are used to bring the lime and silica into the correct ratio and, if necessary and where possible, to raise the level of lime plus silica to at least four times the iron oxide plus alumina, the lime-bearing and silica-bearing materials are blended with the magnesia before it is dead-burnt, being added either to the magnesium hydroxide paste or to the caustic calcined magnesia. The lime to silica ratio is determined by the properties of the resulting magnesia when made into bricks; when the ratio of lime to silica is less than 1.5:1 even when the boron oxide, iron oxide and aluminium oxide contents are low and in the desired relation to sodium oxide, lime and silica then the desired strengths are not achieved. This is shown hereafter in Table 3. When the lime to silica ratio is in excess of 2.2:1 then in the dead-burning process boron oxide is retained preferentially to sodium oxide and it is difficult to achieve the desired low level of boron oxide of less than 0.1% and at the same time a level of sodium oxide at least equal to the level of boron oxide. In the dead-burning of the magnesia material, in order to ensure a product of at least 3.2 g./cc. bulk density the magnesia must be dead-burnt to not less than 1650° C. at a heating rate above a temperature 1000° C. of not less than 20° per minute. If lower heating rates are employed, it is difficult to obtain a product of adequate density. At 2° C. per minute, a density of about 3.1 g./cc. is obtained and at 10° C. per minute a density of about 3.2 g./cc. Only at a heating rate above 20° C. per minute can 3.25 to 3.35 g./cc. be achieved. The heating rate below a temperature of 1000° C. is not critical.

To illustrate the production of dead-burnt refractory magnesias in accordance with this invention the manufacture of such dead-burnt magnesias, and refractory products therefrom, is hereafter described with reference to Tables 2, 3 and 4, together with comparative examples illustrating the criticality of the concentration limits as herein set forth in accord with the invention.

The experiments were carried out with caustic magnesia prepared by lightly calcining magnesium hydroxide precipitated from sea water by lime and by dolomite lime. The calcining was carried out in a multi-hearth Herreshoff furnace in which the maximum temperature reached was within the range 900° C. to 950° C. until the material had between ½% and 2% ignition loss. The caustic calcine was analysed using a direct reading spectrophotometer. The levels of the different impurities, lime, silica, iron oxide and aluminium oxide were then adjusted to the required levels by adding the required amount of material, for example, Spanish quartzite for silica and dolomite flue dust for lime, and mixing thoroughly. The boron oxide content of all samples was found to be between 0.05% and 0.25%. To each sample a weight of sodium carbonate equivalent to 0.5% sodium oxide was added and mixed. The mixture was then briquetted at 20 tons/sq. inch and dead-burned at 1700° C. The resulting dead-burned magnesites had densities of from 3.20–3.35 g./cc. and a mean crystal size of from 20–60 microns.

The several dead-burned magnesites were then made into bricks by the following method.

The dead burnt magnesia was crushed and graded into a batch suitable for brick making containing 70% of particles between 5 and 72 B.S.S. mesh and 30% of particles passing a 72 B.S.S. mesh. The part of the batch passing the 72 B.S.S. mesh was prepared by ball milling to a specific surface between 0.20 and 0.25 square metres/gm. Approximately 4% of an organic bond was then added to the graded magnesia. The organic bond was a sulphite lye solution of specific gravity 1.2. When the batch had been thoroughly mixed it was pressed in a mould at a pressure of approximately 8 tons per square inch. The resulting brick was then fired at 1650° C. to 1700° C., for example, at 1650° C., for 5 hours using a heating rate of no greater than 300° C. per hour.

The results of the various experiments are shown in Tables 2, 3, and 4, in each of which are set out the analyses of the dead-burnt magnesias produced in each experiment together with the modulus of rupture properties of refractory bricks prepared as described above from each dead-burnt material.

TABLE 2.—EFFECT OF IRON OXIDE AND ALUMINA

| Example | 1 | 2 | 3 | 4 | 5 | 6 | 7 | 8 | 9 |
|---|---|---|---|---|---|---|---|---|---|
| Analysis of dead burnt magnesite: | | | | | | | | | |
| CaO | 1.36 | 2.74 | 2.81 | 1.89 | 2.48 | 4.17 | 2.48 | 2.75 | 2.69 |
| $SiO_2$ | 0.78 | 1.71 | 1.72 | 0.90 | 0.91 | 2.15 | 1.20 | 0.86 | 0.76 |
| $Al_2O_3$ | 0.28 | 0.31 | 0.06 | 0.47 | 0.41 | 0.41 | 0.12 | 0.56 | 0.46 |
| $Fe_2O_3$ | 0.17 | 0.12 | 0.50 | 1.33 | 1.56 | 0.65 | 2.12 | 3.91 | 0.63 |
| $Cr_2O_3$ | 0.37 | 0.39 | 0.04 | 0.02 | 0.03 | 0.05 | 0.13 | 0.04 | 0.02 |
| $B_2O_3$ | 0.03 | 0.02 | 0.01 | 0.02 | 0.04 | 0.10 | 0.05 | 0.05 | 0.02 |
| $Na_2O$ | 0.05 | 0.07 | 0.05 | 0.18 | 0.10 | 0.22 | 0.06 | 0.05 | 0.03 |
| MgO | 96.4 | 94.3 | 94.5 | 95.2 | 93.9 | 92.2 | 93.4 | 91.7 | 95.1 |
| Ratio, $CaO/SiO_2$, percent | 1.9 | 1.6 | 1.6 | 2.1 | 2.7 | 1.9 | 2.1 | 3.2 | 3.5 |
| Properties of fired magnesite bricks—modulus of rupture, p.s.i. (1″ x 1″ x 6″ bar), at ° C.: | | | | | | | | | |
| 1260 | 1,925 | 1,950 | 2,600 | 1,590 | 1,640 | 1,980 | 1,000 | 1,220 | 1,535 |
| 1400 | 1,700 | 1,900 | | 200 | 160 | 1,790 | 400 | 150 | 600 |
| 1500 | 1,555 | 1,850 | 1,800 | 160 | 130 | 1,110 | 120 | | 346 |
| Ratio, $Al_2O_3+Fe_2O_3/CaO+SiO_2$, percent | 0.21 | 0.10 | 0.12 | 0.64 | 0.58 | 0.17 | 0.61 | 1.24 | 0.26 |

TABLE 3.—EFFECT OF LIME TO SILICA RATIO

| Example | 1 | 2 | 3 | 4 | 5 | 6 | 7 | 8 |
|---|---|---|---|---|---|---|---|---|
| Dead-burnt magnesia analysis: | | | | | | | | |
| $SiO_2$ | 2.70 | 1.01 | 0.70 | 0.71 | 0.73 | 0.74 | 0.78 | 0.65 |
| CaO | 0.65 | 0.99 | 0.70 | 0.96 | 1.27 | 1.36 | 1.36 | 1.23 |
| $Al_2O_3$ | 0.30 | 0.29 | 0.31 | 0.29 | 0.30 | 0.26 | 0.28 | 0.24 |
| $Fe_2O_3$ | 0.15 | 0.15 | 0.15 | 0.15 | 0.15 | 0.15 | 0.17 | 0.12 |
| $Cr_2O_3$ | 0.03 | 0.03 | 0.05 | 0.03 | 0.04 | 0.05 | 0.37 | 0.36 |
| $B_2O_3$ | <0.01 | <0.01 | <0.01 | <0.01 | <0.01 | <0.01 | 0.03 | 0.04 |
| $Na_2O$ | 0.16 | 0.04 | 0.02 | 0.03 | 0.04 | 0.02 | 0.05 | 0.04 |
| MgO (approx.) | 96.0 | 97.4 | 98.5 | 97.7 | 97.5 | 97.2 | 96.8 | 97.2 |
| $CaO/SiO_2$, percent | 0.3:1 | 1.0:1 | 1.0:1 | 1.3:1 | 1.7:1 | 1.8:1 | 1.7 | 2.0 |
| Properties of bricks—modulus of rupture, p.s.i. (1″ x 1″ x 6″ bar), at ° C.: | | | | | | | | |
| 1260 | 935 | 320 | 435 | 650 | 1,650 | 1,800 | 1,925 | 1,685 |
| 1400 | 500 | 180 | 200 | 280 | 1,400 | 1,500 | | 1,000 |
| 1500 | 250 | 150 | 150 | 150 | 1,100 | 1,200 | 1,555 | 1,060 |

TABLE 4.—EFFECT OF BORON OXIDE AND ALKALI METAL OXIDE

[Iron oxide plus alumina <¼ (silica and lime)]

| Example | 1 | 2 | 3 | 4 | 5 | 6 | 7 | 8 | 9 | 10 |
|---|---|---|---|---|---|---|---|---|---|---|
| Dead-burnt magnesite analysis: | | | | | | | | | | |
| $SiO_2$ | 2.35 | 1.60 | 1.68 | 1.22 | 1.16 | 1.60 | 0.75 | 0.74 | 0.64 | 0.64 |
| CaO | 4.52 | 2.59 | 2.62 | 2.23 | 2.09 | 2.58 | 1.26 | 1.17 | 1.37 | 1.38 |
| $Al_2O_3$ | 0.30 | 0.14 | 0.10 | 0.24 | 0.25 | 0.34 | 0.27 | 0.28 | 0.28 | 0.22 |
| $Fe_2O_3$ | 0.56 | 0.64 | 0.48 | 0.42 | 0.33 | 0.45 | 0.15 | 0.15 | 0.17 | 0.13 |
| $Cr_2O_3$ | 0.07 | 0.12 | 0.03 | 0.03 | 0.05 | 0.03 | 0.35 | 0.44 | 0.38 | 0.35 |
| $B_2O_3$ | 0.08 | 0.05 | <0.01 | 0.04 | 0.07 | 0.14 | 0.05 | 0.01 | 0.06 | 0.11 |
| $Na_2O$ | 0.12 | 0.02 | 0.03 | 0.10 | 0.11 | 0.05 | 0.03 | 0.04 | 0.04 | 0.02 |
| MgO | 91.8 | 94.6 | 94.5 | 95.4 | 95.5 | 94.7 | 96.7 | 96.7 | 96.8 | 96.9 |
| Ratio $CaO:SiO_2$, percent | 1.9 | 1.6 | 1.6 | 1.8 | 1.8 | 1.6 | 1.7 | 1.6 | 2.1 | 2.2 |
| Properties of fired magnesite bricks—modulus of rupture, p.s.i. (1″ x 1″ x 6″ bar), at ° C.: | | | | | | | | | | |
| 1260 | 1,760 | 323 | 2,245 | 1,730 | 1,650 | 150 | 1,355 | 1,630 | 1,780 | 1,850 |
| 1400 | | 180 | 1,400 | 1,700 | | <100 | 800 | 1,270 | | |
| 1500 | 1,420 | 134 | 1,240 | | 1,360 | <100 | | 1,000 | 1,645 | |

The modulus of rupture of the bricks made from each magnesia is determined by the following procedure.

A test piece of one inch square cross section cut from the fired brick is supported at the test temperature on knife edges close to the end of the test piece and stressed at the centre point by a loaded moving knife edge. The load is increased at a constant rate such that the stress increases at a rate of 600 lbs./sq. in./min. until failure of the test piece occurs. The modulus of rupture is then calculated from the applied force at failure and the test piece dimensions using the formula:

$$3wl/2bd^2$$

when $w$=the load in pounds, $l$=the distance between supports in inches, $b$=the width of the specimen in inches and $d$=the depth of the specimen in inches.

Considering firstly the experimental results set forth in Table 2 it will be seen that Examples 1, 2, 3 and 6 illustrate the preparation of dead-burnt magnesias in accord with the invention, the products being within the required critical compositional limits and being capable of formulation into refractory bricks having good hot strength, as measured by the modulus of rupture, at each of the three temperatures considered. Examples 4, 5, 7 and 8 all fall outside the scope of this invention and show the deleterious effect when iron oxide and alumina contents are outside the critical limits at different lime:silica ratios. Likewise Example 9 is not in accord with the present invention, the iron oxide plus alumina content of the dead-burnt magnesia being just in excess of the specified percentage limit and being coupled with a high lime:silica ratio.

In Table 3 Examples 5, 6, 7 and 8 illustrate dead-burnt refractory magnesias in accord with this invention. Examples 1, 2, 3 and 4 are not in compliance with the critical compositional limits however, their lime:silica ratios being below the minimum of 1.5:1.

Table 4 illustrates the effect of the boron oxide and alkali metal content on the properties of the dead-burnt magnesia. Of the examples in this table, Examples 2, 6, 7 and 10 are not in accord with this invention, the percentages of sodium oxide being less than the respective percentages of boron oxide. Likewise, Examples 6 and 10 are not in accord with this invention, for the reason that the boron oxide content is beyond the critical upper limit for this component of the dead-burnt magnesia.

The above examples show the criticality of the compositional limits which must be imposed on each of the respective components of the dead-burnt refractory magnesia in order to obtain the improved hot strength of refractories made therefrom in accord with this invention, and further that it is not sufficient for only a proportion of compositional criteria to be observed; all of the criteria must be adhered to, the invention lying in the applicants' discovery of the specific combination of all of these criteria to enable a dead-burnt high quality refractory magnesia to be obtained.

We claim:

1. A dead-burnt refractory magnesia comprising magnesium oxide, lime, silica, iron oxide, alumina, boron oxide and at least one alkali metal oxide selected from the group consisting of sodium oxide, potassium oxide and lithium oxide, said oxides being present in the following amounts and proportions: between 90 and 99% by weight of magnesium oxide (MgO) up to 5% by weight of calcium oxide (CaO), the ratio of the weight of calcium oxide to the weight of silica ($SiO_2$) in the dead-burnt magnesia being between 1.5:1 and 2.2:1, iron oxide ($F_2O_3$) and alumina ($Al_2O_3$) in total amount by percentage weight up to one quarter of the combined weight of calcium oxide and silica, boron oxide ($B_2O_3$) up to 0.1% by weight, and said at least one oxide selected from sodium oxide ($Na_2O$), potassium oxide ($K_2O$) and lithium oxide ($Li_2O$) in total amount at least equivalent to the weight of boron oxide and up to a maximum of 0.25% by weight.

2. A dead-burnt refractory magnesia as claimed in claim 1 wherein the ratio of the weight of calcium oxide to the weight of silica in the magnesia is between 1.7:1 and 2.0:1.

3. A dead-burnt refractory magnesia as claimed in claim 1 wherein the boron oxide content is a maximum of 0.05% by weight.

4. A dead-burnt refractory magnesia as claimed in claim 1 which comprises additionally chromium oxide ($Cr_2O_3$) in amount up to 0.5% by weight.

5. A dead-burnt refractory magnesia as claimed in claim 1 comprising between 90% and 99% by weight of magnesium oxide and up to 5% by weight of calcium oxide, the ratio of the weight of calcium oxide to the weight of silica in the dead-burnt magnesia being between 1.7:1 and 2.0:1, the dead-burnt magnesia further comprising iron oxide and alumina in total amount by percentage weight up to one quarter of the combined weight of calcium oxide and silica, boron oxide up to 0.05% by weight, and sodium oxide in amount at least equal to the weight of boron oxide and up to a maximum of 0.25% by weight.

6. Magnesia refractory articles of high hot strength comprising ceramically-bonded, dead-burnt, high purity, magnesia refractory grains having the composition defined in claim 1.

References Cited

UNITED STATES PATENTS

| | | | |
|---|---|---|---|
| 2,640,759 | 6/1953 | Hughey | 106—58 |
| 2,823,134 | 2/1958 | Atlas | 106—58 |
| 3,141,790 | 7/1964 | Davies et al. | 106—58 |
| 3,275,461 | 9/1966 | Davies et al. | 106—58 |
| 3,383,226 | 5/1968 | Hildinger et al. | 106—58 |

JAMES E. POER, Primary Examiner

U.S. Cl. X.R.

106—59